United States Patent
Ramasamy et al.

(10) Patent No.: US 11,832,196 B2
(45) Date of Patent: Nov. 28, 2023

(54) METHOD AND APPARATUS TO SUPPORT SEVERAL MODELS OF A PART OR A PLURALITY OF PARTS UNDER A SINGLE BASIC INPUT AND OUTPUT SYSTEM (BIOS)

(71) Applicant: DELL PRODUCTS L.P., Round Rock, TX (US)

(72) Inventors: Suresh Ramasamy, Cedar Park, TX (US); Lars Fredrik Proejts, Zhongshan District (TW); Ravichandra Rama, Leander, TX (US); Ching Wei Chang, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/865,183

(22) Filed: Jul. 14, 2022

(65) Prior Publication Data

US 2023/0017005 A1    Jan. 19, 2023

Related U.S. Application Data

(63) Continuation of application No. 17/374,371, filed on Jul. 13, 2021.

(51) Int. Cl.
*H04W 52/44* (2009.01)
*H04L 67/145* (2022.01)
*H04W 84/12* (2009.01)

(52) U.S. Cl.
CPC .......... *H04W 52/44* (2013.01); *H04L 67/145* (2013.01); *H04W 84/12* (2013.01)

(58) Field of Classification Search
CPC ..... H04W 52/44; H04W 84/12; H04W 52/48; H04W 52/50; H04W 52/367; H04L 67/145
See application file for complete search history.

(56) References Cited

U.S. PATENT DOCUMENTS

| | | | |
|---|---|---|---|
| 11,265,052 B1* | 3/2022 | Proejts | H04B 7/0602 |
| 2018/0288710 A1* | 10/2018 | Luo | H04B 7/06 |
| 2018/0367177 A1 | 12/2018 | Ramasamy et al. | |
| 2019/0140340 A1 | 5/2019 | Ramasamy et al. | |
| 2022/0077591 A1 | 3/2022 | Kim et al. | |
| 2022/0094055 A1 | 3/2022 | Ramasamy et al. | |
| 2022/0102856 A1 | 3/2022 | Chang et al. | |

* cited by examiner

*Primary Examiner* — Mandish K Randhawa
(74) *Attorney, Agent, or Firm* — Larson Newman, LLP (57) ABSTRACT

An information handling system includes a wireless local area network (WLAN) radio and a system embedded controller (EC). An antenna controller may determine an antenna type from a group consisting of a passive antenna and an active antenna, map a platform-unique subsystem identifier in accordance with the antenna type, configure a heartbeat message path to the system EC based on the antenna type, and control a WLAN radio transmit power level based on a heartbeat status.

20 Claims, 6 Drawing Sheets

METHOD AND APPARATUS TO SUPPORT SEVERAL MODELS OF A PART OR A PLURALITY OF PARTS UNDER A SINGLE BASIC INPUT AND OUTPUT SYSTEM (BIOS)

CROSS REFERENCE TO RELATED APPLICATIONS

This application is a continuation of U.S. patent application Ser. No. 17/374,371, entitled "FAILSAFE HANDOFF BETWEEN SYSTEM EMBEDDED CONTROLLER AND RADIO USING ANTENNA CONTROLLER," filed on Jul. 13, 2021, the disclosure of which is hereby expressly incorporated by reference in its entirety.

FIELD OF THE DISCLOSURE

The present disclosure generally relates to information handling systems, and more particularly relates to a system and method for failsafe handoff between a system embedded controller and a radio using an antenna controller.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system includes a wireless local area network (WLAN) radio and a system embedded controller (EC). An antenna controller may determine an antenna type from a group consisting of a passive antenna and an active antenna, map a platform-unique subsystem identifier in accordance with the antenna type, configure a heartbeat message path to the system EC based on the antenna type, and control a WLAN radio transmit power level based on a heartbeat status.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
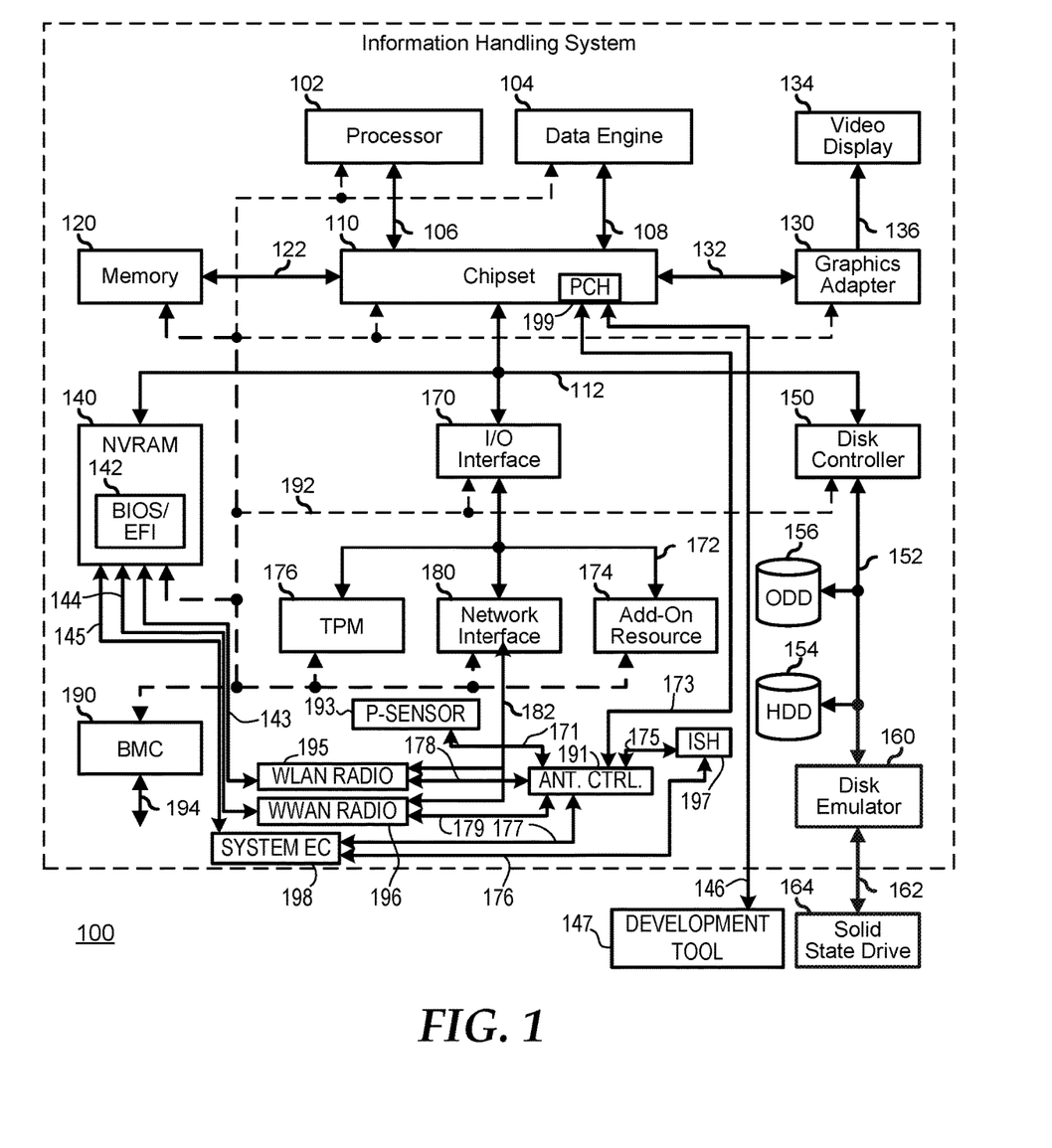
FIG. 1 is a block diagram illustrating an information handling system according to an embodiment of the present disclosure.

FIG. 1 illustrates a generalized embodiment of information handling system 100. For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 100 can include processing resources for executing machine-executable code, such as a central processing unit (CPU), a programmable logic array (PLA), an embedded device such as a System-on-a-Chip (SoC), or other control logic hardware. Information handling system 100 can also include one or more computer-readable medium for storing machine-executable code, such as software or data. Additional components of information handling system 100 can include one or more storage devices that can store machine-executable code, one or more communications ports for communicating with external devices, and various input and output (I/O) devices, such as a keyboard, a mouse, and a video display. Information handling system 100 can also include one or more buses operable to transmit information between the various hardware components.

Information handling system 100 can include devices or modules that embody one or more of the devices or modules described above, and operates to perform one or more of the methods described above. Information handling system 100 includes a processors 102 and 104, a chipset 110, a memory 120, a graphics adapter 130, include a basic input and output system/extensible firmware interface (BIOS/EFI) module 140, a disk controller 150, a disk emulator 160, an input/output (I/O) interface 170, a network interface 180, baseboard management controller (BMC) 190, antenna controller (AC) 191, proximity sensor (P-sensor) 193, wireless local area network (WLAN) radio 195, wireless wide area network (WWAN) radio 196, integrated sensor hub (ISH) 197, and system embedded controller (EC) 198. Chipset 110 comprises platform controller hub (PCH) 199. Processor 102 is connected to chipset 110 via processor interface 106, and processor 104 is connected to chipset 110 via processor interface 108. Memory 120 is connected to chipset 110 via a memory bus 122. Graphics adapter 130 is connected to chipset 110 via a graphics interface 132, and provides a video display output 136 to a video display 134. In a particular embodiment, information handling system 100 includes separate memories that are dedicated to each of processors 102 and 104 via separate memory interfaces. An example of memory 120 includes random access memory (RAM) such as static RAM (SRAM), dynamic RAM (DRAM), non-volatile RAM (NV-RAM), or the like, read only memory (ROM), another type of memory, or a combination thereof.

BIOS/EFI module 140, disk controller 150, and I/O interface 170 are connected to chipset 110 via an I/O channel 112. An example of I/O channel 112 includes a Peripheral Component Interconnect (PCI) interface, a PCI-Extended (PCI-X) interface, a high-speed PCI-Express (PCIe) interface, another industry standard or proprietary communication interface, or a combination thereof. Chipset 110 can also include one or more other I/O interfaces, including an Industry Standard Architecture (ISA) interface, a Small Computer Serial Interface (SCSI) interface, an Inter-Integrated Circuit (I$^2$C) interface, a Serial Peripheral Interface (SPI), a Universal Serial Bus (USB), another interface, or a combination thereof. BIOS/EFI module 140 includes BIOS/EFI code operable to detect resources within information handling system 100, to provide drivers for the resources, initialize the resources, and access the resources. BIOS/EFI module 140 includes code that operates to detect resources within information handling system 100, to provide drivers for the resources, to initialize the resources, and to access the resources.

Disk controller 150 includes a disk interface 152 that connects the disc controller to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits a solid-state drive 164 to be connected to information handling system 100 via an external interface 162. An example of external interface 162 includes a USB interface, an IEEE 1194 (Firewire) interface, a proprietary interface, or a combination thereof. Alternatively, solid-state drive 164 can be disposed within information handling system 100.

I/O interface 170 includes a peripheral interface 172 that connects the I/O interface to an add-on resource 174 and to network interface 180. Peripheral interface 172 can be the same type of interface as I/O channel 112, or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral channel 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board or add-in card disposed within information handling system 100, a device that is external to the information handling system, or a combination thereof.

Network interface 180 represents a NIC disposed within information handling system 100, on a main circuit board of the information handling system, integrated onto another component such as chipset 110, in another suitable location, or a combination thereof. Network interface device 180 includes network channel 182 that can provide an interface to devices that are internal or external to information handling system 100. In a particular embodiment, network channel 182 of a different type than peripheral channel 172 and network interface 180 translates information from a format suitable to the peripheral channel to a format suitable to external devices. An example of network channel 182 includes InfiniBand channels, Fibre Channel channels, Gigabit Ethernet channels, proprietary channel architectures, or a combination thereof. Network channel 182 can be connected to external network resources (not illustrated), either directly or via component such as WLAN radio 195, WWAN radio 196, or both. The network resource can include another information handling system, a data storage system, another network, a grid management system, another suitable resource, or a combination thereof.

BMC 190 is connected by a management interface 192 to a plurality of system components, such as processor 102, processor 104, memory 120, chipset 110, graphics adapter 130, I/O interface 170, disk controller 150, NVRAM module 140, TPM 176, network interface 180, and add-on resource 174. BMC 190 is connected to an external management interface 194 for platform management by an external IHS.

Network interface 180 is connected to WLAN radio 195 and WWAN radio 196 via network channel 182. WLAN radio 195 is connected to antenna controller (AC) 191 via interconnect 178. WWAN radio 196 is connected to AC 191 via interconnect 179. AC 191 is connected to proximity sensor (P-sensor) 193 via interconnect 171. AC 191 is connected to integrated system hub (ISH) 197 via interconnect 175. ISH 197 is connected to system embedded controller (EC) 198 via interconnect 176. AC 191 is connected to system EC 198 via interconnect 177. System EC 198 is connected to NVRAM 140 comprising BIOS/EFI 142 via interconnect 145. NVRAM 140 is connected to WLAN radio 195 via interconnect 143. NVRAM 140 is connected to WWAN radio 195 via interconnect 144. AC 191 is connected to platform controller hub (PCH) 199 via interconnect 173. PCH 199 can be connected to a development tool 147 via interconnect 146. Elements within IHS 100 can be implemented as described using similar names with respect to elements shown on other drawings described below.

Figure 2:
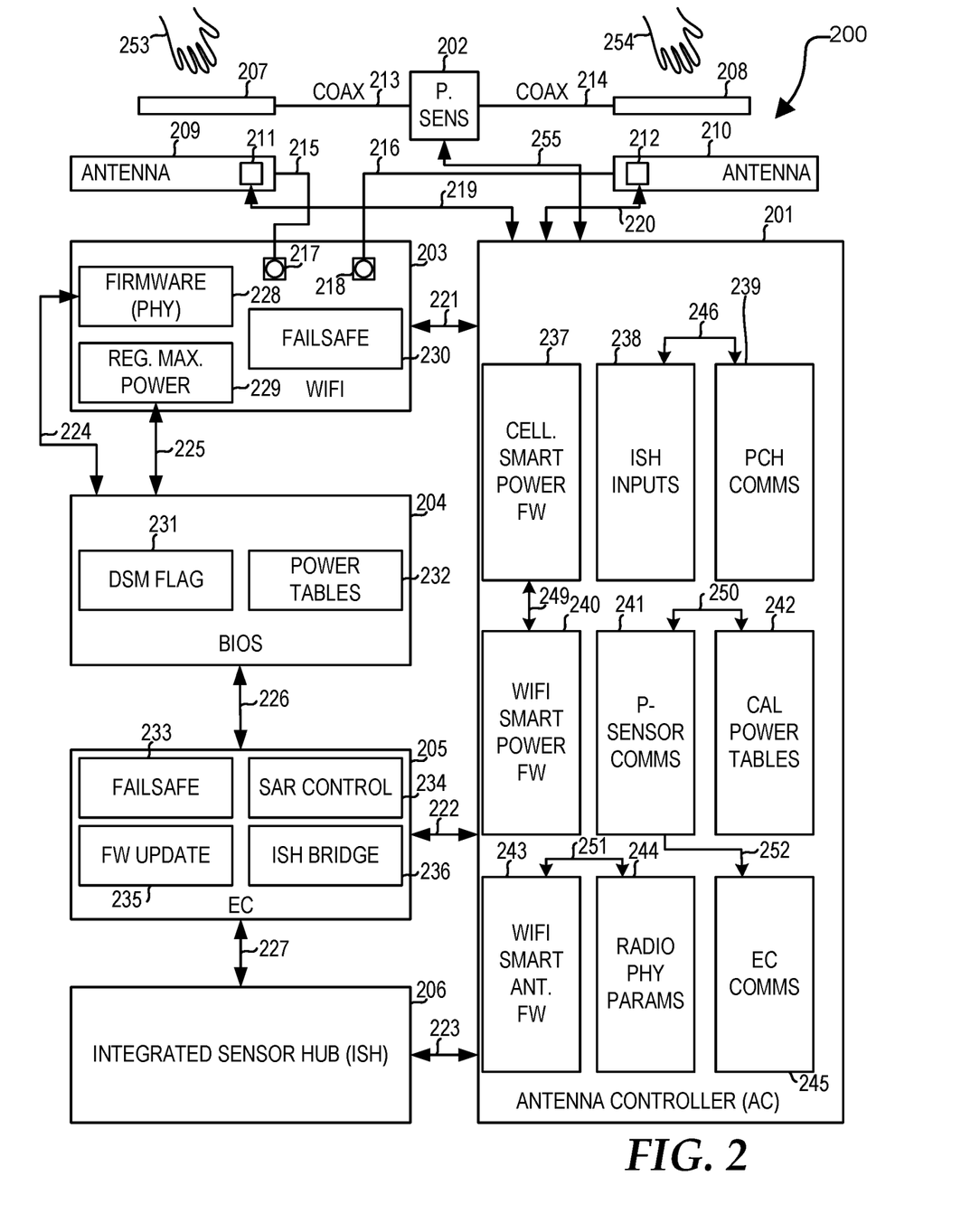
FIG. 2 is a block diagram illustrating a system for an intelligent firmware failsafe handoff mechanism between a system embedded controller and a wireless local area network (WLAN) radio using an antenna controller according to an embodiment of the present disclosure.

FIG. 2 is a block diagram illustrating a system for an intelligent firmware failsafe handoff mechanism between a system embedded controller (EC) and a wireless local area network (WLAN) radio using an antenna controller (AC) according to an embodiment of the present disclosure. The system 200 includes AC 201, proximity sensor (P-sensor) 202, WLAN radio (e.g., WiFi radio, where WiFi refers to the Institute of Electrical and Electronics Engineers 802.11 wireless local area network standard) 203, basic input/output system (BIOS) 204, system EC 205, integrated sensor hub (ISH) 206, proximity sensing conductor 207, proximity sensing conductor 208, antenna 209, and antenna 210. In the case of active antennas, antenna 209 can include antenna tuning circuit 211, and antenna 210 can include antenna tuning circuit 212.

AC 201 includes cellular smart power firmware block 237, ISH inputs block 238, platform controller hub (PCH) communications block 239, WLAN radio smart power firmware block 240, P-sensor communications block 241, calibration power tables block 242, WLAN radio smart antenna firmware block 243, radio physical interface (PHY) parameters block 244, and EC communications block 245. WLAN radio 203 includes firmware block 228 for the radio physical interface (PHY), regulatory maximum power value storage block 229, failsafe block 230, antenna connector 217, and antenna connector 218. BIOS 204 includes device-specific method (DSM) flag block 231 and power tables block 232. System EC 205 includes failsafe block 233, specific-absorption-rate (SAR) block 234, firmware update block 235, and ISH bridge block 236. As an example, SAR control block 234 can be implemented as a finite state machine (FSM) for handling P-sensor-related events. As an example, SAR control block 234 can be implemented to track switching of states of operation in response to triggering of P-sensor 202 and ending of the triggering. When proximity of a portion of a body of a user, such as hand 253, is sensed near proximity sensing conductor 207, located near antenna 209, P-sensor 202, which is electrically connected to proximity sensing conductor 207 via interconnect 213, can provide proximity sensing information to AC 201 via interconnect 255. AC 201 can provide an output, such as the proximity sensing information or radio transmit power level control information to EC 205 via interconnect 222. SAR control block 234 can track a state for operation of radio 203 based, at least in part, on the triggering of P-sensor 202 or the ending of the triggering. As an example, even in the event of a failure involving AC 201, EC 205 can use the state information of SAR control block 234 to communicate control information to BIOS 204 via interconnect 226, and BIOS 204 can provide to radio 203 via interconnect 225 a radio transmit power level value from power tables block 232 to control a radio transmit power level of radio 203, assuring continued radio operation in regulatory compliance (e.g., a SAR limit) even during a failure event. As one example, BIOS 204 can provide a particular radio transmit power level value from power tables block 232 to radio 203. As another example, BIOS 204 can provide a power table of a plurality of radio transmit power level values from power tables block 232 to radio 203. In accordance with at least one embodiment, failsafe block 233 of EC 205, failsafe block 230 of radio 203, or both, can provide a failure notification, for example, upon cessation of reception of a heartbeat message between AC 201 and EC 205 or between AC 201 and radio 203, respectively. The failure notification can be communicated among elements that have not failed, for example, among radio 203, BIOS 204, and EC 205. Thus, for example, while SAR control block 234 can maintain state information based on an output of AC 201 that can be based on proximity sensing information obtained from P-sensor 202, EC 205 can disregard the state information of SAR control block 234 as possibly stale and inaccurate when a failure of AC 201 is suspected and can instead utilize failsafe features, such as a failsafe block, to control a radio transmit power level of radio 203 during a failure event.

AC 201 is connected to P-sensor 202 via interconnect 255. P-sensor 202 is connected to proximity sensing conductor 207 via interconnect 213, which may, for example, be a coaxial cable or a stripline, such as a microstrip, transmission line. P-sensor 202 is connected to proximity sensing conductor 208 via interconnect 214, which may, for example, be a coaxial cable or a stripline, such as a microstrip, transmission line. AC 201 is connected to antenna tuning circuit 211 via interconnect 219. AC 201 is connected to antenna tuning circuit 212 via interconnect 220. Antenna connector 217 is connected to antenna 209 via interconnect 215, which may, for example, be a coaxial cable or a stripline, such as a microstrip, transmission line. Antenna connector 218 is connected to antenna 210 via interconnect 216, which may, for example, be a coaxial cable or a stripline, such as a microstrip, transmission line. Proximity sensing conductor 207 is located proximate to antenna 209 and is sensitive to the presence of a user (for example, a portion of a body of the user), such as hand 253, proximate to proximity sensing conductor 207, and thus proximate to antenna 209. Proximity sensing conductor 208 is located proximate to antenna 210 and is sensitive to the presence of a user (for example, a portion of a body of the user), such as hand 254, proximate to proximity sensing conductor 208, and thus proximate to antenna 210.

WLAN radio 203, for example, firmware block 228 for the radio physical interface, is connected to BIOS 204 via interconnect 224. WLAN radio 203, for example, regulatory maximum power value storage block 229, is connected to BIOS 204 via interconnect 225. BIOS 204 is connected to system EC 205 via interconnect 226. System EC 205 is connected to ISH 206 via interconnect 227. AC 201 is connected to WLAN radio 203 via interconnect 221. AC 201 is connected to system EC 205 via interconnect 222. AC201 is connected to ISH 206 via interconnect 223.

Cellular smart power firmware block 237 is connected to WiFi smart power firmware block 240 via interconnect 249. ISH inputs block 238 is connected to PCH communications block 239 via interconnect 246. P-sensor communications block 241 is connected to calibration power tables block 242 via interconnect 250. WiFi smart antenna firmware block 243 is connected to radio PHY parameters block 244 via interconnect 251. P-sensor communications block 241 is connected to EC communications block 245 via interconnect 252.

Figure 3:
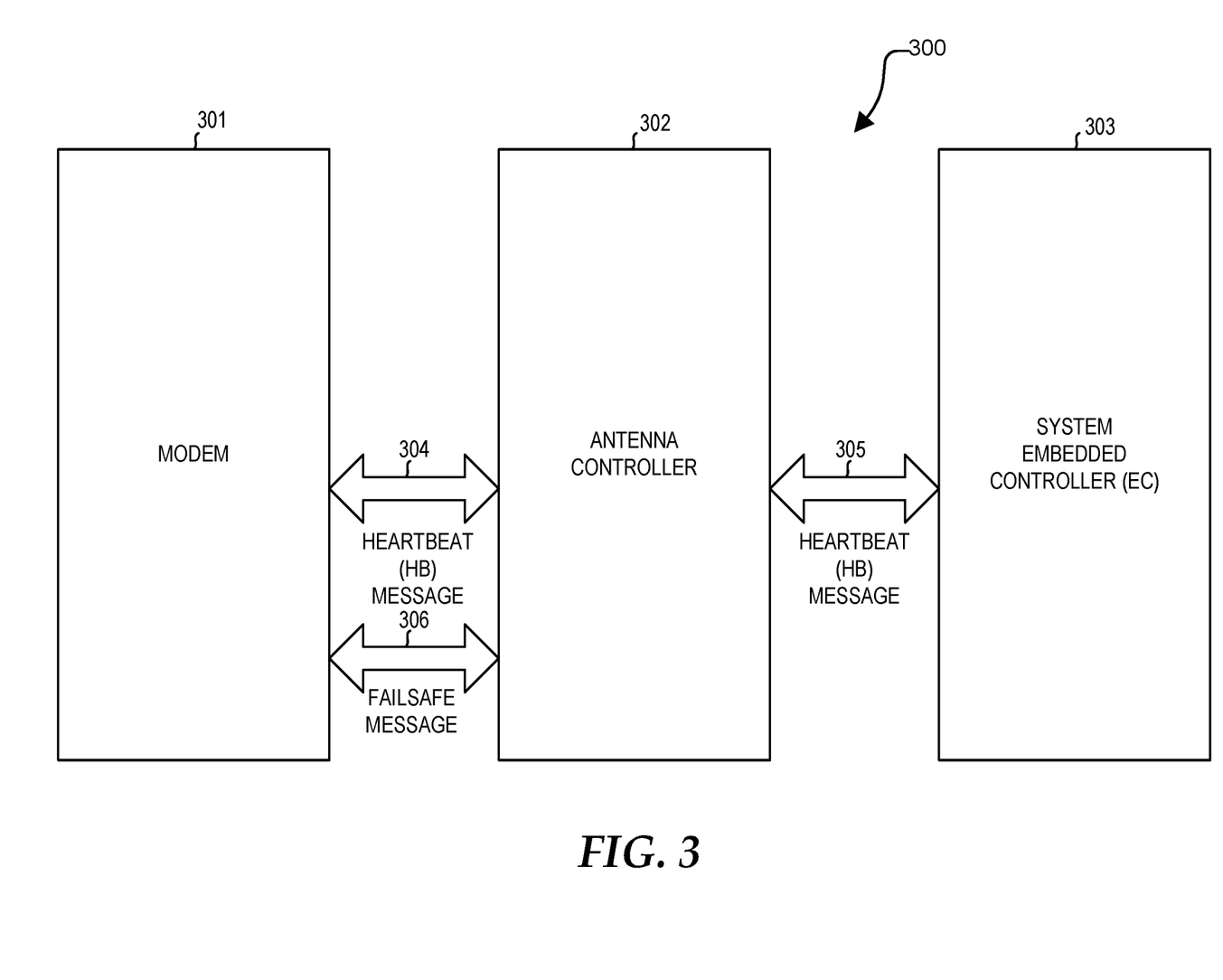
FIG. 3 is a block diagram illustrating a system with respect to the flow diagrams of FIGS. 4, 5, and 6 according to an embodiment of the present disclosure.
Figure 4:
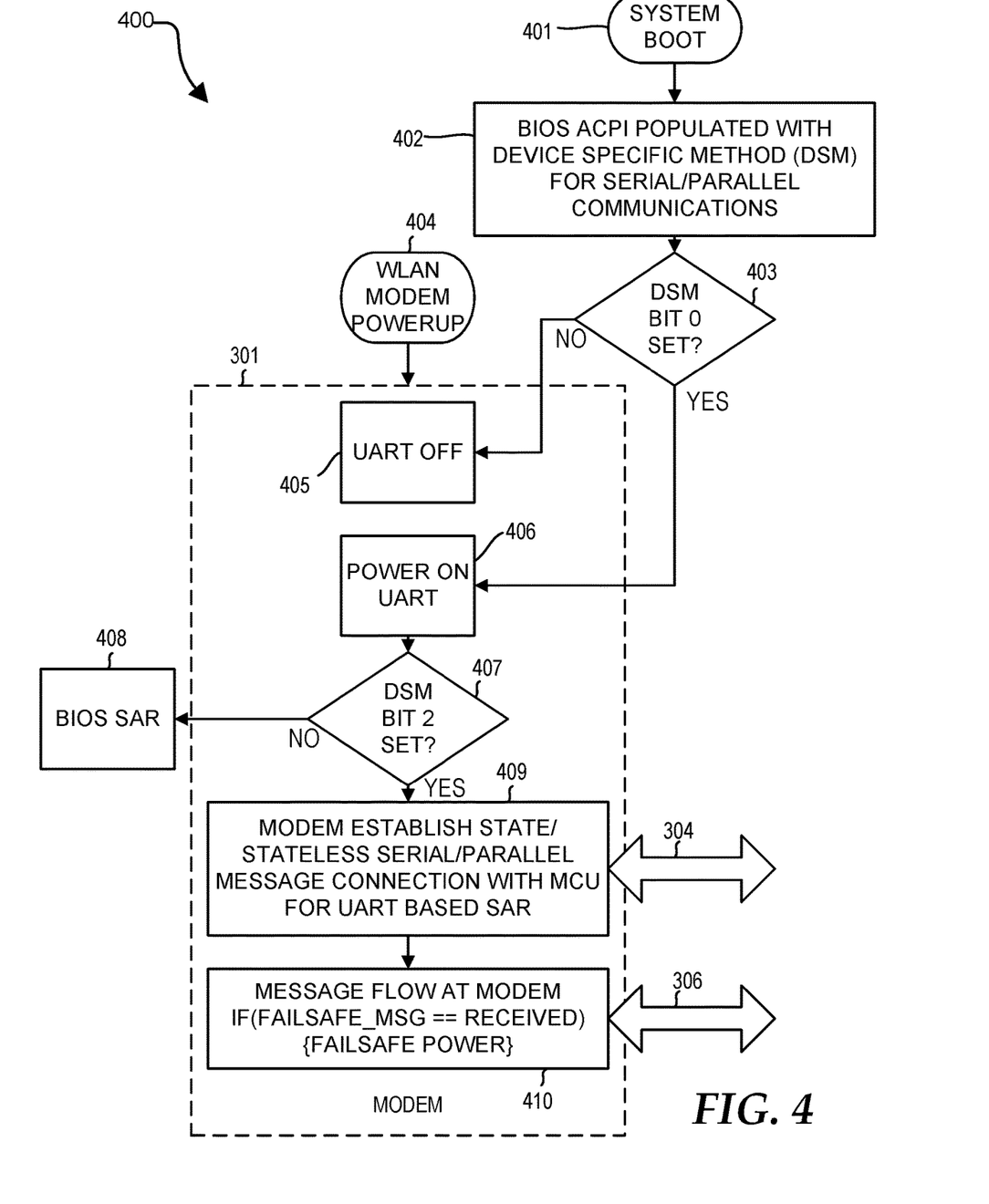
FIG. 4 is a flow diagram illustrating a method of a modem of the system of FIG. 3 according to an embodiment of the present disclosure.
Figure 5:
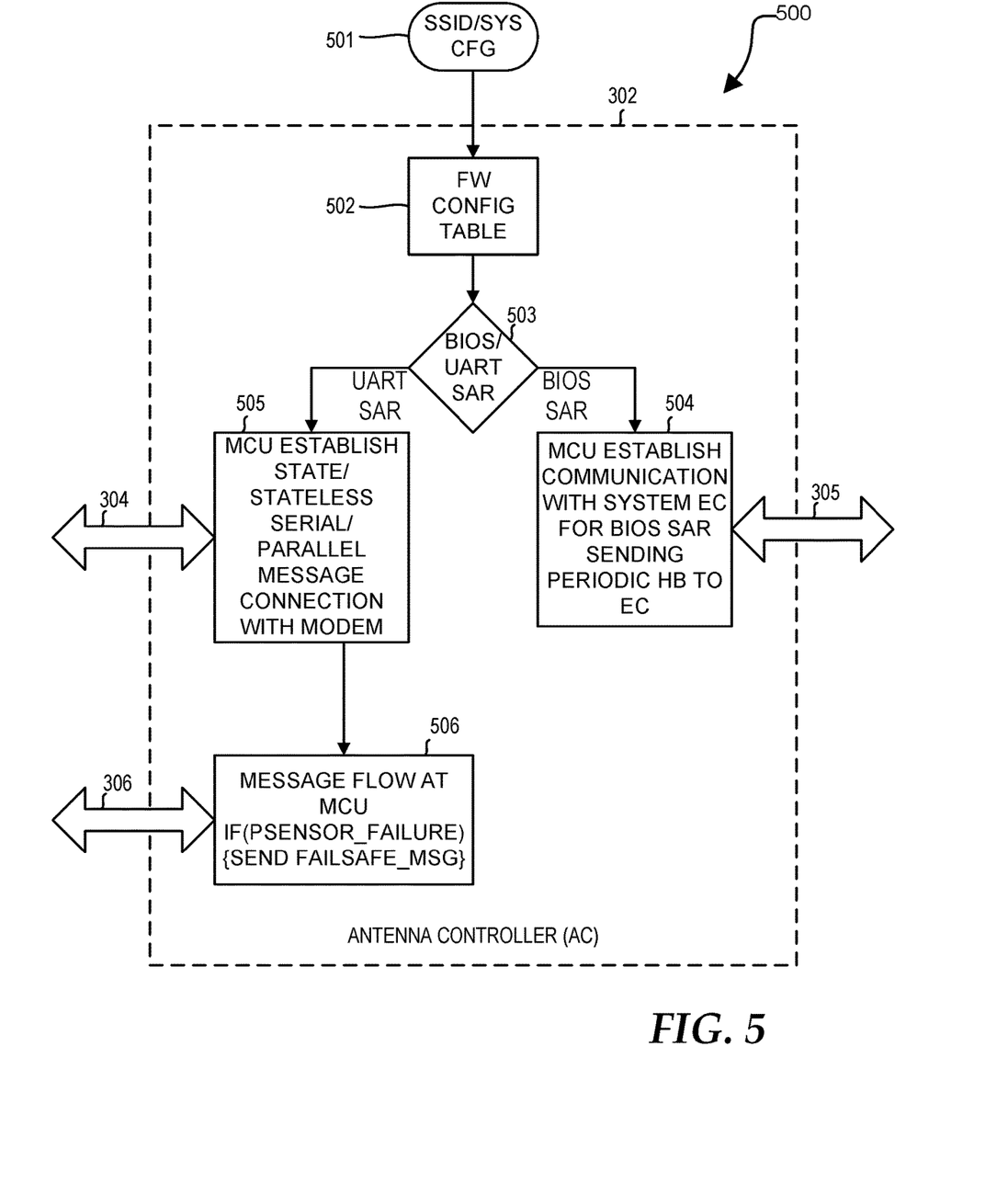
FIG. 5 is a flow diagram illustrating a method of an antenna controller of the system of FIG. 3 according to an embodiment of the present disclosure.
Figure 6:
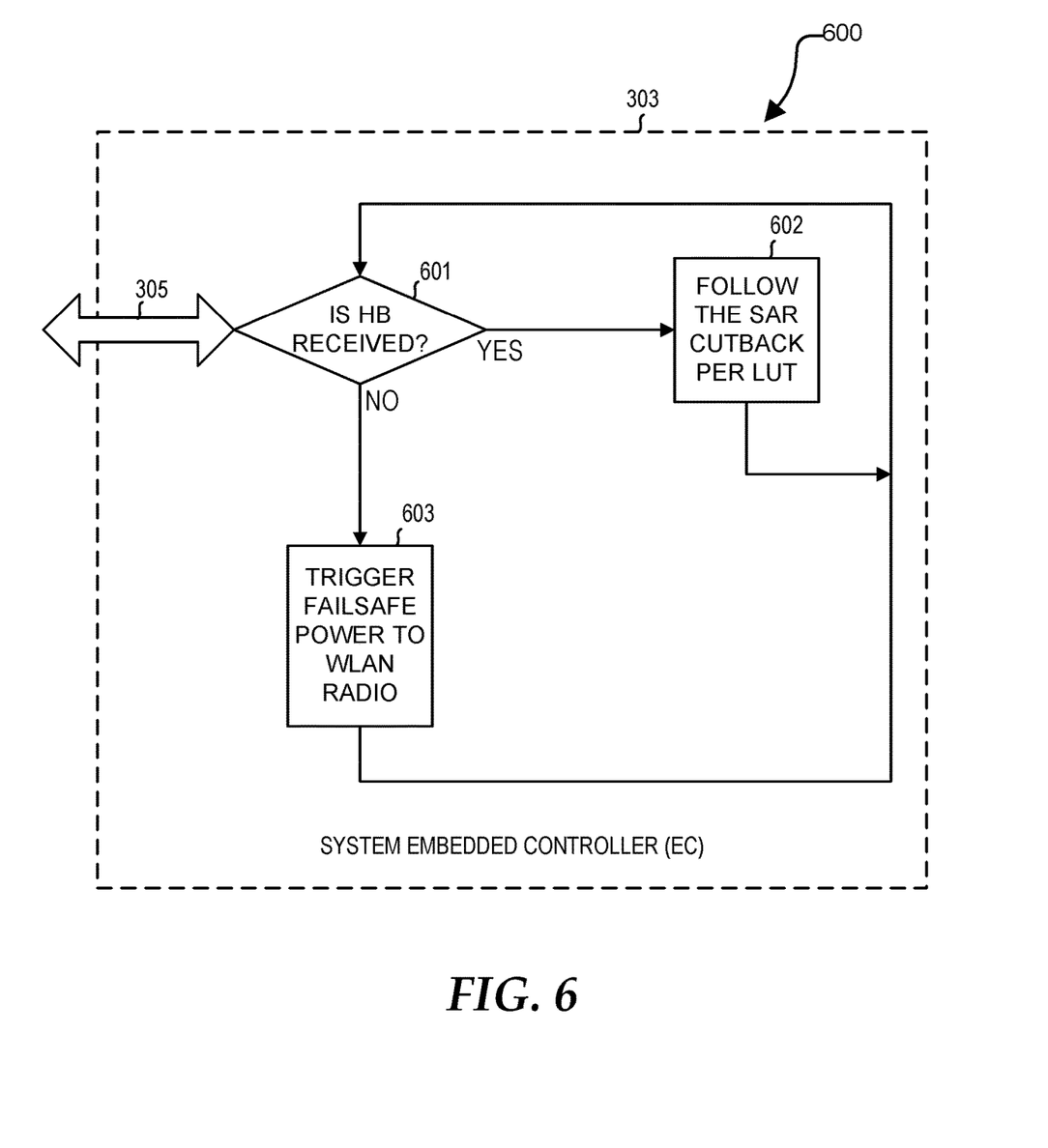
FIG. 6 is a flow diagram illustrating a method of a system embedded controller of the system of FIG. 3 according to an embodiment of the present disclosure.

FIG. 3 shows a system related to the flow diagrams of FIGS. 4, 5, and 6 according to an embodiment of the present disclosure. System 300 includes modem 301, antenna controller (AC) 302, and system embedded controller (EC) 303. Modem 301 may be implemented in a radio transceiver, such as WLAN radio 203 of FIG. 2. AC 302 may be implemented, for example, in AC 201 of FIG. 2. System EC 303 may be implemented, for example, in EC 205 of FIG. 2. A heartbeat (HB) message is communicated between modem 301 and AC 302 via HB message path 304. As an example, HB message path 304 can be established along an interconnect, such as interconnect 221 between AC 201 and WLAN radio 203 of FIG. 2. Modem 301 can send a HB message to AC 302 via HB message path 304. AC 302 can send a HB message to modem 301 via HB message path 304.

An HB message is communicated between AC 302 and system EC 303 via HB message path 305. AC 302 can send a HB message to system EC 303 via HB message path 305. System EC 303 can send a HB message to AC 302 via HB message path 305. As an example, HB message path 305 can be established along an interconnect, such as interconnect 222 between AC 201 and EC 205 of FIG. 2. An HB message can be sent regularly so that its recent receipt can provide evidence of system functionality and its recent absence can provide evidence of a system fault. A failsafe message is communicated between modem 301 and AC 302 via failsafe message path 306. Modem 301 can send a failsafe message to AC 302 via failsafe message path 306.

AC 302 can send a failsafe message to modem 301 via failsafe message path 306. As an example, failsafe message path 306 can be established along an interconnect, such as interconnect 221 between AC 201 and WLAN radio 203. A failsafe message can be sent to update status and configure system operation, such as a system control communications mode and a WLAN radio power level. A failsafe message via failsafe message path 306 can be responsive to receipt or non-receipt of a HB message via a HB message path. The elements of FIG. 3, portions of which also appear in each of FIGS. 4, 5, and 6, show an example of how the methods of FIGS. 4, 5, and 6 can be implemented in system elements.

FIG. 4 shows a method of a modem of the system of FIG. 3 according to an embodiment of the present disclosure. Method 400 begins at block 401 with initiation of a system boot process to establish an initial operational configuration of an IHS. From block 401, method 400 continues to block 402. At block 402, the BIOS advanced configuration and power interface (ACPI) is populated with device-specific method (DSM) information for serial or parallel communications. From block 402, method 400 continues to decision block 403. At decision block 403, a decision is made as to whether or not DSM bit 0 is set. If DSM bit 0 is not set, method 400 continues to block 405, where universal asynchronous receiver and transmitter (UART) is disabled (for example turned off). If DSM bit 0 is set, method 400 continues to block 406, where the UART is enabled (for example turned on).

From block 406, method 400 continues to decision block 407. At decision block 407, a decision is made as to whether or not DSM bit 2 is set. If DSM bit 2 is not set, method 400 continues to block 408. At block 408, a WLAN radio transmit power level consistent with a specific absorption rate (SAR) is set according to information obtained from a BIOS. If DSM bit 2 is set, method 400 continues to block 409. At block 409, the modem establishes a state/stateless serial/parallel message connection with a microcontroller unit (MCU) for UART-based SAR setting of the WLAN radio transmit power level via HB message path 304. From block 409, method 400 continues to block 410. At block 410, message flow is processed at the modem. If a failsafe message is received from the MCU of the AC via failsafe message path 306, a failsafe WLAN radio transmit power level is selected to be used by the WLAN radio.

FIG. 5 shows a method of an antenna controller (AC) of the system of FIG. 3 according to an embodiment of the present disclosure. Method 500 begins at block 501 with the initiation of determination of the subsystem identifier (SSID) and system configuration (SYS-CFG). The SSID is a value that identifies a physical instantiation of an IHS, for example, the type (e.g., model) of IHS and the components it comprises. The SSID can be stored, for example, in a BIOS or EC of the IHS, so the AC can read the SSID from the BIOS or EC to identify the physical instantiation (e.g., the model of IHS and components it comprises). The SYS-CFG is a value that can be read by an analog-to-digital converter (ADC), which can sample a voltage level and infer an appropriate binary (e.g., hexadecimal) value (e.g., word), which can be used to uniquely identify an IHS. AC 302 can infer SKU information from the SSID. The SSID information can be provided to AC 302 in the form of a lookup-table (LUT), general purpose input/output (GPIO), SYS-CFG, or inter-integrated circuit (I2C) based message, for example, as a number of bytes within such a message. From block 501, method 500 continues to block 502. At block 502, a firmware configuration table is read. For example, AC 302 can read information from a firmware feature lookup table of a microcontroller unit (MCU). As another example, WLAN radio transmit power level information can be read from power tables block 232 shown in FIG. 2. A platform-unique subsystem identifier (SSID) for wireless local area network (WLAN) service can be assigned (for example mapped) in accordance with an antenna type. Information about the antenna type can be read at block 502. From block 502, method 500 continues to decision block 503. At decision block 503, a decision is made as to whether WLAN radio transmit power level information consistent with a specific absorption rate (SAR) is to be set according to information obtained from a BIOS or according to information obtained via a message sent via a connection between the AC and the modem.

As an example, the AC may be AC 302 and, as an example, may be implemented according to AC 201 shown in FIG. 2. As an example, the modem may be modem 301 and, as an example, may be implemented in WLAN radio 203 shown in FIG. 2. As an example, AC 302 can determine an antenna type from a group consisting of a passive antenna and an active antenna based on information read from the firmware feature lookup table, and the decision of decision block 503 can be made upon that basis, with a determination of a passive antenna leading toward block 504 and a determination of an active antenna leading toward block 505. As an example, AC 302 can be configured to send a heartbeat message to the system EC for an antenna type denoting a passive antenna and to a WLAN radio for an antenna type denoting an active antenna.

If the WLAN radio transmit power level information is to be obtained from the BIOS, such as BIOS 204 shown in FIG. 2, method 500 continues from decision block 503 to block 504. At block 504, the MCU establishes communication with a system EC for the configuration of a WLAN radio transmit power level consistent with the BIOS SAR mode and sends period HB messages to the system EC. As an example, the MCU is in AC 302. As an example, AC 302 sends the periodic HB messages to system EC 303. As an example, AC 302 configures a heartbeat message path (for example HB message path 305) to a system embedded controller (EC) (for example system EC 303) based on the antenna type. In relation to block 504, AC 302 can disable a serial interface to a WLAN radio. The disabling the serial interface can be performed according to a device-specific method (DSM) provided in a basic input-output system (BIOS).

If, at decision block 503, the WLAN radio transmit power level information is to be communicated via a message sent via a connection between the AC and the modem, method 500 continues to block 505. At block 505, the MCU establishes a state/stateless serial/parallel message connection with the modem. As an example, the message connection may be a state-based message connection. As an example, the message connection may be a stateless message connection. As an example, the message connection may be provided over a serial interface of the WLAN radio. Thus, when the antenna type is determined to denote an active antenna, AC 302 can send WLAN radio parameters via a serial interface to a WLAN radio. As another example, the message connection may be provided over a parallel interface of the WLAN radio.

From block 505, method 500 continues to block 506. At block 506, a message flow is processed at the MCU. AC 302 can control a WLAN radio transmit power level based on a heartbeat status, wherein the heartbeat status is indicative of receipt or non-receipt of a heartbeat message. As an example, is a P-sensor failure is detected, the MCU can send a failsafe message to the modem. As an example, a P-sensor failure can be detected by an absence of an expected HB message. As an example, the failsafe message can cause the modem to set a WLAN radio transmit power level to a failsafe WLAN radio transmit power level. The failsafe WLAN radio transmit power level can be a level that assures regulatory compliance regardless of user proximity, which may be undetectable in the event of a P-sensor failure.

AC 302 can maintain the WLAN radio transmit power at a maximum WLAN radio transmit power level when the heartbeat status indicates receipt of the heartbeat message, for example, within a prescribed time during which the heartbeat message is expected to be received. AC 302 can reduce the WLAN radio transmit power level upon non-receipt of an expected heartbeat message by an element selected from a group consisting of the AC, a WLAN radio, and the system EC.

FIG. 6 shows a method of a system embedded controller (EC) of the system of FIG. 3 according to an embodiment of the present disclosure. Method 600 begins at decision block 601, where a decision is made as to whether or not a HB message, such as a recently expected HB message, has been received. HB message path 305 can be monitored to check whether the HB message has been received. If the HB message has been received, method 600 continues to block 602. At block 602, control of WLAN radio transmit power level is implemented normally. Any WLAN radio transmit power level cutback to maintain SAR compliance can be implemented in accordance with values as may be obtained from a lookup table (LUT), for example, based on P-sensor detection of a user's proximity to one or more WLAN radio antennas. From block 602, method 600 returns to decision block 601. If the HB message has not been received, for example, if a recently expected HB message, as may be one of several HB messages in a periodic train of HB messages, has not been received, method 600 continues to block 603.

At block 603, a selection for the WLAN radio to use a failsafe WLAN radio transmit power level is triggered. The system EC, such as system EC 303, as may be implemented according to system EC 205 shown in FIG. 2, can communicate with the WLAN radio via BIOS 204, as may occur via interconnects 226, 225, and 224, which can tolerate failure of communication between the AC, such as AC 302, as may be implemented according to AC 201 shown in FIG. 2, and a modem, such as modem 301, which may be implemented in WLAN radio 203 shown in FIG. 2. An example of such a communication failure can be a failure of communication via interconnect 221. As an example, upon reaching block 603 of method 600, the system EC can initiate the triggering of the selection for the WLAN radio to use the failsafe WLAN radio transmit power level.

In accordance with at least one embodiment, an intelligent firmware (FW) failsafe handoff mechanism between a system EC and a WLAN radio using antenna controller is provided. Providing such as failsafe handoff system and method provides a technological improvement by assuring reliable control of a WLAN radio transmit power level even as one or more portions of an IHS may not operate as intended.

IHS platforms can support active and passive WLAN antenna configurations (which can be referred to by their respective stock keeping units (SKUs), where, for example, one SKU may represent a WLAN antenna configuration for basic operation and another SKU may represent a WLAN antenna configuration with more advanced features), and several of such WLAN antenna configurations can be supported under a single BIOS. As an example, each SKU can represent a specific model of a part or a plurality of parts that may be installed to provide a respective particular hardware configuration of an IHS or a subsystem of an IHS. Active WLAN antennas can be controlled by an antenna controller using WLAN radio parameters communicated via a serial interface using a messaging protocol to the WLAN radio, which can provide enhanced performance. However, for passive antennas, a serial interface path to the WLAN radio can be disabled via a device-specific method (DSM) in BIOS.

Further, WLAN radio SAR-compliant transmit power level cutback can provide regulatory compliance of the WLAN radio transmit power level. Such cutback can be performed when a human is detected in close proximity to the IHS or a portion of the IHS, such as one or more locations of WLAN radio antennas. Cutting back the WLAN radio transmit power level would impose a prolonged reduction of WLAN radio receive and transmit data throughput. To achieve the cutback specifically when a human is in close proximity to the system, P-sensors are attached to or near WLAN radio antennas, which can be of either active or passive antenna SKUs, and the antenna controller can manage the system. SAR cutback can be controlled and initiated by smart AC FW and communicated to WLAN radio FW via serial interface in the case of an active antenna SKU.

In the case of a passive antenna SKU, SAR cutback can be implemented via a system EC, through a BIOS, to WLAN radio drivers, to WLAN radio FW, without the need for a serial interface to be enabled. It would be possible that after WLAN radio transmit power level cutback is disabled by smart AC FW, the smart AC hardware may fail or the FW may lock up, which could leave the WLAN radio transmitting in full transmit power mode. In such a state, if a human were present near the system, the desired WLAN radio transmit power level cutback might not occur. This could happen with either active or passive WLAN radio antenna SKUs or with both. To avoid such possibility, a failsafe handoff system and method are provided.

An intelligent FW fail safe mechanism is provided that is actively managed by antenna controller based on a particular antenna configuration (e.g., an antenna SKU) supported by the IHS platform. A firmware (FW) failsafe mechanism involves smart AC FW first determining the supported antenna SKU, which may be active or passive, by reading the FW feature lookup table stored in the MCU, and mapping a platform-unique SSID to the feature. Next. the smart AC FW dynamically configures a heartbeat messaging path to the system EC in the case of a passive antenna, or to the radio via a serial interface in the case of an active antenna. The smart AC FW sends a periodic heartbeat to the EC via a serial interface, such as I2C, for a passive antenna SKU, or to WLAN radio FW via a UART.

As long as the WLAN radio FW receives this heartbeat, it will allow the system to stay in a maximum WLAN radio transmit power level mode, avoiding power level cutback. As soon as a pre-determined time expires (TIMEOUT)

without the WLAN radio FW receiving a new heartbeat from antenna controller, for example, due to a failure event at the controller or the attached P-sensors, the WLAN radio FW applies a failsafe WLAN radio transmit power level cutback, which can assure regulatory compliance of the WLAN radio transmit power level. Similarly, as soon as a pre-determined time expires (TIMEOUT) without the system EC receiving a new heartbeat, the system EC triggers an ACPI notification which then notifies a WLAN radio driver of a failure event. The WLAN radio driver will then force the WLAN radio to operate at a failsafe WLAN radio transmit power level cutback, which can assure regulatory compliance of the WLAN radio transmit power level.

By providing heartbeat messaging to a WLAN (for example WiFi) radio through a UART in system configurations where a UART is present or heartbeat messaging through a system EC, to a BIOS, to the WLAN radio in system configurations where no UART is available for direct communication with the WLAN radio, an AC can continually check the status of the system components and maintain operation that assures regulatory compliance regardless of system component faults that may occur. In the event of failure of the AC, the system EC can trigger the WLAN radio to use a failsafe WLAN radio transmit power level, which can assure regulatory compliance regardless of the operability o the AC.

In accordance with at least one embodiment, the capability is provided to implement an intelligent MCU FW failsafe mechanism via a serial interface to a WLAN radio or, where the serial interface to the WLAN radio is not supported, via platform EC to BIOS to WLAN radio. Accordingly, persistent regulatory compliance is assured based on a chosen platform communication path to a WLAN radio among multiple possible platform communication paths that may exist for different antenna configurations (e.g., antenna SKUs) even though the available platform communication paths that may exist for a particular antenna configuration (for example antenna SKU) are a subset of all possible platform communication paths for all antenna configurations (for example antenna SKUs).

In accordance with at least one embodiment, a method includes reading, by an antenna controller (AC), information from an element selected from a group consisting of a firmware feature lookup table of a microcontroller unit (MCU), a general-purpose input-output (GPIO) pin signal, a subsystem identifier (SSID), and a system configuration (SYS-CFG) value; determining, at the AC, an antenna type from a group consisting of a passive antenna and an active antenna based on the reading the information; mapping a platform-unique subsystem identifier (SSID) in accordance with the antenna type; configuring a heartbeat message path to a system embedded controller (EC) based on the antenna type; and controlling, by the AC, a WLAN radio transmit power level based on a heartbeat status, wherein the heartbeat status is indicative of receipt or non-receipt of a heartbeat message. In accordance with at least one embodiment, the method further includes, when the antenna type is determined to denote the active antenna, sending WLAN radio parameters via a serial interface to a WLAN radio.

In accordance with at least one embodiment, the method further includes, when the antenna type is determined to denote the passive antenna, disabling a serial interface to a WLAN radio. In accordance with at least one embodiment, the method wherein the disabling the serial interface is performed according to a device-specific method (DSM) provided in a basic input-output system (BIOS). In accordance with at least one embodiment, the AC maintains the WLAN radio transmit power at a maximum WLAN radio transmit power level when the heartbeat status indicates receipt of the heartbeat message. In accordance with at least one embodiment, the AC reduces the WLAN radio transmit power level upon non-receipt of an expected heartbeat message by an element selected from a group consisting of the AC, a WLAN radio, and the system EC. In accordance with at least one embodiment, the AC is configured to send the heartbeat message to the system EC for an antenna type denoting the passive antenna and to a WLAN radio for an antenna type denoting the active antenna.

In accordance with at least one embodiment, an information handling system (IHS) includes an antenna; a wireless local area network (WLAN) radio; a system embedded controller (EC); and an antenna controller (AC), the AC configured to read information from an element of a group consisting of a firmware feature lookup table (LUT) of a microcontroller unit (MCU), a general-purpose input-output (GPIO) pin signal, a subsystem identifier (SSID), and a system configuration (SYS-CFG) value, to determine an antenna type from a group consisting of a passive antenna and an active antenna based on the information read, to map a platform-unique subsystem identifier (SSID) in accordance with the antenna type, to configure a heartbeat message path to the system EC based on the antenna type, and to control a WLAN radio transmit power level based on a heartbeat status, wherein the heartbeat status is indicative of receipt or non-receipt of a heartbeat message.

In accordance with at least one embodiment, the AC is further configured to send WLAN radio parameters via a serial interface to the WLAN radio when the antenna type is determined to denote the active antenna. In accordance with at least one embodiment, the AC is further configured to disable a serial interface to the WLAN radio when the antenna type is determined to denote the passive antenna. In accordance with at least one embodiment, the AC is further configured to disable the serial interface according to a device-specific method (DSM) provided in a basic input-output system (BIOS). In accordance with at least one embodiment, the AC is further configured to maintain the WLAN radio transmit power level at a maximum WLAN radio transmit power level when the heartbeat status indicates receipt of the heartbeat message.

In accordance with at least one embodiment, the AC is further configured to reduce the WLAN radio transmit power level upon non-receipt of an expected heartbeat message by an element from a group consisting of the AC, the WLAN radio, and the system EC. In accordance with at least one embodiment, the AC is further configured to send the heartbeat message to the system EC for the antenna type denoting the passive antenna and to the WLAN radio for the antenna type denoting the active antenna.

In accordance with at least one embodiment, a method includes determining, at an antenna controller (AC), an antenna type from a group consisting of a passive antenna and an active antenna; configuring a heartbeat message path to a system embedded controller (EC) based on the antenna type; and controlling, by the AC, WLAN radio transmit power level based on a heartbeat status, wherein the heartbeat status is indicative of receipt or non-receipt of a heartbeat message. In accordance with at least one embodiment, the method further comprises, when the antenna type is determined to denote the active antenna, sending WLAN radio parameters via a serial interface to a WLAN radio. In accordance with at least one embodiment, the method further comprises, when the antenna type is determined to denote the passive antenna, changing communication between the AC and a WLAN radio in a manner selected from a group consisting of disabling a serial interface to a WLAN radio and limiting communication with the WLAN radio to power control.

In accordance with at least one embodiment, the AC maintains the WLAN radio transmit power level at a maximum WLAN radio transmit power level when the heartbeat status indicates receipt of the heartbeat message. In accordance with at least one embodiment, the AC reduces the WLAN radio transmit power level upon non-receipt of an expected heartbeat message by an element selected from a group consisting of the AC, a WLAN radio, and the system EC. In accordance with at least one embodiment, the AC is configured to send the heartbeat message to the system EC for an antenna type denoting a passive antenna and to a WLAN radio for the antenna type denoting an active antenna, and wherein, for the antenna type denoting the passive antenna, the AC is further configured to establish communication with the WLAN radio for power control.

For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, the information handling system can be a personal computer, a laptop computer, a smart phone, a tablet device or other consumer electronic device, a network server, a network storage device, a switch router or other network communication device, or any other suitable device and may vary in size, shape, performance, functionality, and price. Further, the information handling system can include processing resources for executing machine-executable code, such as a central processing unit (CPU), a programmable logic array (PLA), an embedded device such as a System-on-a-Chip (SoC), or other control logic hardware. An information handling system can also include one or more computer-readable medium for storing machine-executable code, such as software or data. Additional components of an information handling system can include one or more storage devices that can store machine-executable code, one or more communications ports for communicating with external devices, and various input and output (I/O) devices, such as a keyboard, a mouse, and a video display. Information handling systems can also include one or more buses operable to transmit information between the various hardware components.

When referred to as a "device," a "module," a "unit," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions or receives and executes instructions responsive to a propagated signal; so that a device connected to a network can communicate voice, video or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method comprising:
   reading, by an antenna controller (AC), information from an element of a group consisting of a firmware feature lookup table of a microcontroller unit, a general-purpose input-output pin signal, a subsystem identifier, and a system configuration (SYS-CFG) value;
   determining an antenna type of an antenna based on the information read;
   mapping a platform-unique identifier, the platform-unique identifier being a SYS-CFG value, to the antenna type;
   controlling the antenna according to a first antenna configuration, wherein a plurality of antenna configurations including the first antenna configuration are supported under a single basic input and output system (BIOS), wherein control of the antenna is effected via a serial interface using a messaging protocol, the AC sending a message to a second element selected from a group consisting of, for a first antenna type, an enclosure controller (EC) and, for a second antenna type, a radio; and implementing a firmware failsafe mechanism via a platform communication path selected from a group consisting of a first platform communication path via the serial interface to the radio and a second platform communication path via the EC.

2. The method of claim 1, wherein a first stock keeping unit (SKU) represents the first antenna configuration of the plurality of antenna configurations, and a second SKU represents a second antenna configuration of the plurality of antenna configurations.

3. The method of claim 1, wherein an advanced configuration and power interface of the BIOS is populated with device-specific method (DSM) information, wherein establishment of a message connection depends upon the DSM information.

4. The method of claim 1, wherein the firmware failsafe mechanism is actively managed by the AC based on the first antenna configuration.

5. The method of claim 1, wherein the AC sends a periodic heartbeat message to determine a failure event.

6. The method of claim 5, wherein the AC controls a radio transmit power level based on a heartbeat status, wherein the heartbeat status is indicative of receipt or non-receipt of the heartbeat message.

7. The method of claim 1, wherein specific absorption rate compliant transmit power level cutback provides regulatory compliance of the radio transmit power level.

8. An information handling system (IHS) comprising:
an antenna;
a radio;
an embedded controller (EC); and
an antenna controller (AC) configured to read information from an element of a group consisting of a firmware feature lookup table of a microcontroller unit, a general-purpose input-output pin signal, a subsystem identifier, and a system configuration (SYS-CFG) value, to determine an antenna type of the antenna based on the information read, to map a platform-unique identifier, the platform-unique identifier being SYS-CFG value, to the antenna type, to control the antenna according to a first antenna configuration, wherein a plurality of antenna configurations comprising the first antenna configuration are supported under a single basic input and output system (BIOS), wherein the control of the antenna is effected via a serial interface using a messaging protocol, the AC sending a message to a second element selected from a group consisting of, for a first antenna type, the EC and, for a second antenna type, a radio, and to implement a firmware failsafe mechanism via a platform communication path selected from a group consisting of a first platform communication path via the serial interface to the radio and a second platform communication path via the EC.

9. The IHS of claim 8, wherein a first stock keeping unit (SKU) represents the first antenna configuration of the plurality of antenna configurations, and a second SKU represents a second antenna configuration of the plurality of antenna configurations.

10. The IHS of claim 8, wherein an advanced configuration and power interface of the BIOS is populated with device-specific method (DSM) information, wherein establishment of a message connection depends upon the DSM information.

11. The IHS of claim 8, wherein the firmware failsafe mechanism is actively managed by the AC based on the first antenna configuration.

12. The IHS of claim 8, wherein the AC sends a periodic heartbeat message to determine a failure event.

13. The IHS of claim 12, wherein the AC controls a radio transmit power level based on a heartbeat status, wherein the heartbeat status is indicative of receipt or non-receipt of the heartbeat message.

14. The IHS of claim 8, wherein specific absorption rate compliant transmit power level cutback provides regulatory compliance of the radio transmit power level.

15. A method comprising:
reading, by an antenna controller (AC), information from an element of a group consisting of a firmware feature lookup table of a microcontroller unit, a general-purpose input-output pin signal, a subsystem identifier, and a system configuration (SYS-CFG) value;
determining an antenna type of an antenna based on the information read;
mapping a platform-unique identifier, the platform-unique identifier being a SYS-CFG value, to the antenna type;
controlling the antenna according to a first antenna configuration, wherein a plurality of antenna configurations comprising the first antenna configuration are supported under a single basic input and output system (BIOS), the AC sending a message to a second element selected from a group consisting of, for a first antenna type, an enclosure controller (EC) and, for a second antenna type, a radio; and
implementing a firmware failsafe mechanism via a platform communication path selected from a group consisting of a first platform communication path via a serial interface to the radio and a second platform communication path via the EC.

16. The method of claim 15, wherein a first stock keeping unit (SKU) represents the first antenna configuration of the plurality of antenna configurations, and a second SKU represents a second antenna configuration of the plurality of antenna configurations.

17. The method of claim 15, wherein an advanced configuration and power interface of the BIOS is populated with device-specific method (DSM) information, wherein establishment of a message connection depends upon the DSM information.

18. The method of claim 15, wherein the firmware failsafe mechanism is actively managed by the AC based on the first antenna configuration.

19. The method of claim 15, wherein the AC sends a periodic heartbeat message to determine a failure event.

20. The method of claim 19, wherein the AC controls a radio transmit power level based on a heartbeat status, wherein the heartbeat status is indicative of receipt or non-receipt of the heartbeat message.

* * * * *